(12) United States Patent
Kim et al.

(10) Patent No.: US 7,350,036 B2
(45) Date of Patent: Mar. 25, 2008

(54) TECHNIQUE TO PERFORM CONCURRENT UPDATES TO A SHARED DATA STRUCTURE

(75) Inventors: Daehyun Kim, San Jose, CA (US); Victor W. Lee, San Jose, CA (US); Anthony D. Nguyen, Mountain View, CA (US); Mikhail Smelyanskiy, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 327 days.

(21) Appl. No.: 11/195,224

(22) Filed: Aug. 1, 2005

(65) Prior Publication Data
US 2007/0027870 A1 Feb. 1, 2007

(51) Int. Cl.
*G06F 13/14* (2006.01)
(52) U.S. Cl. .................................... 711/149
(58) Field of Classification Search ................ 711/149; 712/1
See application file for complete search history.

(56) References Cited

U.S. PATENT DOCUMENTS

| | | | | |
|---|---|---|---|---|
| 4,099,242 A | * | 7/1978 | Houston et al. | 707/2 |
| 4,876,641 A | * | 10/1989 | Cowley | 712/13 |
| 2001/0054058 A1 | * | 12/2001 | Del Pino | 709/201 |
| 2003/0163667 A1 | * | 8/2003 | Barlow et al. | 712/7 |
| 2005/0251575 A1 | * | 11/2005 | Bayardo et al. | 709/227 |

* cited by examiner

*Primary Examiner*—Kevin L. Ellis
(74) *Attorney, Agent, or Firm*—Trop, Pruner & Hu, P.C.

(57) ABSTRACT

A technique to perform concurrent updates to a shared data structure. At least one embodiment of the invention concurrently stores copies of a data structure within a plurality of local caches, updates the local caches with a partial result of a computation distributed among a plurality of processing elements, and returns the partial results to combining logic in parallel, which combines the partial results into a final result.

23 Claims, 5 Drawing Sheets

TECHNIQUE TO PERFORM CONCURRENT UPDATES TO A SHARED DATA STRUCTURE

FIELD

Embodiments of the invention relate to microprocessor architecture. More particularly, embodiments of the invention relate to a technique for performing a number of computations in a number of processing elements in parallel and combining the result of the operations into a single result and updating a memory location with the result.

BACKGROUND

In computer systems containing multiple processors or a single processor with multiple processing logic or "cores", applications or other tasks may be partitioned among multiple processors or cores that each performs portions of the application or task and later updates the same data structure with a partial result. For example, a task of counting a number of persons with the last name "Smith" in a phone book may be divided among two processors or cores, such that each processor or core counts the number of "Smiths" in one half of the phone book. The number of "Smiths" in the phone book may be stored in a data structure by combining (e.g., adding) the results of each partial result from the two processors or cores.

Because multiple processors or cores are updating the same data structure concurrently, however, conflict conditions, such as a "race condition", may result, causing degradation in performance or even incorrect results to be stored in the data structure containing the result. In general, two prior art approaches to solving this problem have been implemented in multi-core or multi-processor computing systems. FIG. 1 illustrates a computer system architecture in which one prior art technique is used for concurrently updating a data structure with partial results from two or more processors or cores. In the computing architecture of FIG. 1, four processing cores or processors ("processing elements") do not have a local memory, such as an "level 1" (L1) cache, but instead store a partial result of a computational task directly to a shared memory, such as a "level 2" (L2) cache or some other memory, such as "main memory", which may consist of dynamic random access memory (DRAM) or some other memory type.

In the prior art system of FIG. 1, each update from the four processors to a data structure stored in the shared memory must be made in a serial manner in order to avoid conflict conditions, such as a race condition. As a result, the system illustrated in FIG. 1 may suffer from performance degradation, as each data structure update must wait on an earlier data structure update to complete. In some prior art examples, a data structure is updated by first acquiring exclusive ownership of the data structure, or "lock". In the meantime, other agents must wait until the lock is released in order to gain exclusive ownership and subsequently update the data structure. This serialized data structure update technique may cause delays in system operation, as agents must wait to update a data structure.

FIG. 2 illustrates computing system in which at least one other prior art technique for updating a common data structure may be used. In the system of FIG. 2, each of the four processing elements has a local memory, such as an L1 cache (denoted "$L1x" in FIG. 2), to store local copies of data stored in the shared memory, such as an L2 cache or main memory, such as DRAM. In one prior art data structure update technique associated with system of FIG. 2, only one processing element may manipulate, or "own", a copy of a data structure stored in the shared memory at a time by obtaining a exclusive ownership, or a "lock", of the data structure. In this case, each processor may update its local copy of the data structure with its partial result stored in its local memory and other processing elements will have to request ownership of the updated copy of the data structure. Once requested, the updated data structure may be transferred to the requesting processing element, which will have exclusive ownership of the copy of the data structure until it has updated the data structure with its partial result. The above-described technique can continue until each partial result from each processing element has been updated into a local copy of the data structure. The local copy of the data structure may then be written back to the corresponding data structure within the shared memory.

The prior art example described above with reference to FIG. 2 may take numerous processing cycles to complete as well as complex logic to handle the requests and ownership transfers among the processing elements. Therefore, the system of FIG. 2 may incur performance degradation and/or increased cost.

Other prior art examples may include ones in which a user, via complex software routines, may control the coherency protocol among the various processing elements as they update local copies of the data structures, which are ultimately stored into the corresponding location of shared memory. However, these prior art "software solutions" require the user to develop coherency software and to control the entire processes, which may result in increased system cost, complexity, and performance degradation.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Embodiments of the invention pertain to microprocessor architecture. More particularly, embodiments of the invention pertain to a technique to concurrently update a shared data structure with partial results of a computation distributed among a plurality of processing elements.

At least one embodiment of the invention allows a number of processing elements, such as a number of processors or processing cores, to concurrently use copies of a data structure to be updated by partial results of computations performed by the number of processing elements. Furthermore, at least one embodiment includes logic to combine the partial results from the number of processing elements into a final result that can be written to the original data structure stored within a memory shared by each of the processing elements, such as an L2 cache or main memory, such as DRAM.

In one embodiment, the logic to combine the partial results ("reduction logic") is located within a memory controller that enables communication between the processing elements and a main memory, such as DRAM. In other embodiments, the reduction logic is located within processing elements to enable communication between the processing cores and a shared memory, such as an L2 cache, whereas in other embodiments, the reduction logic may be distributed between the memory controller and the processing elements. Regardless, embodiments of the invention generally enable a task to be divided among a number of processing elements, the results of which may be combined into a final result and stored into a data structure within a memory shared among the processing elements, such as an L2 cache and/or main memory, such as DRAM. Furthermore, at least one embodiment may perform the above operations in a manner without the user having to control coherence protocols among the number of processors and the shared memory, such that the partial computations and the update of the data structure with the final result may be done without intervention from the user, or in an "atomic" manner.

Figure 1:
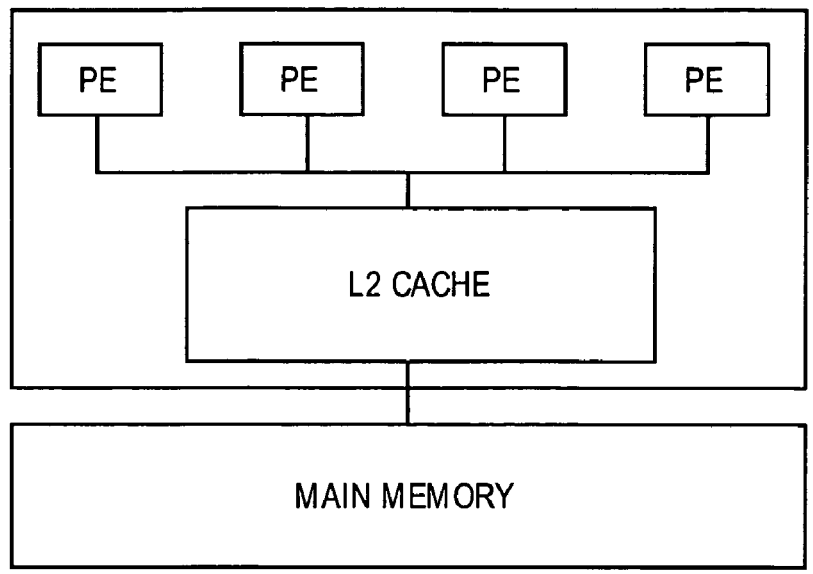
FIG. 1 illustrates a computer system in which at least one prior art data structure update technique may be used.
Figure 2:
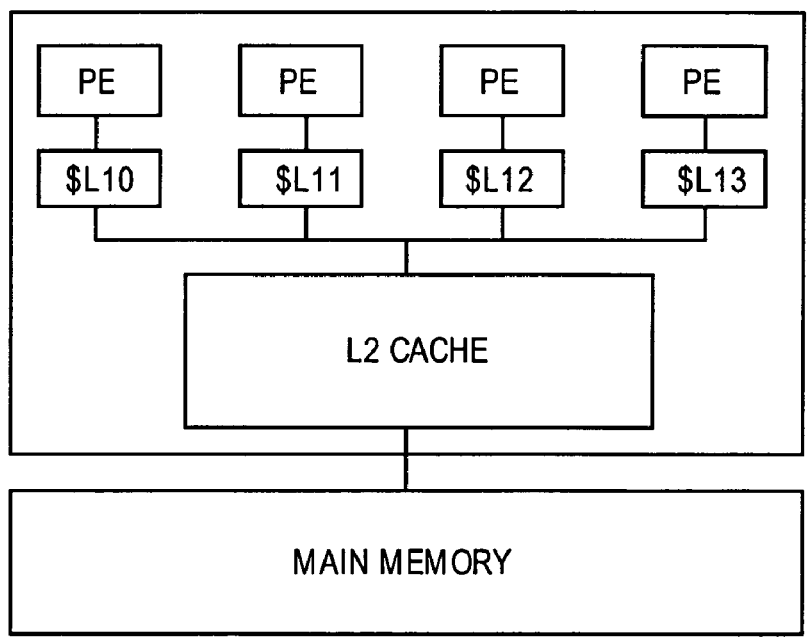
FIG. 2 illustrates a computer system in which at least one prior art data structure update technique may be used.
Figure 3:
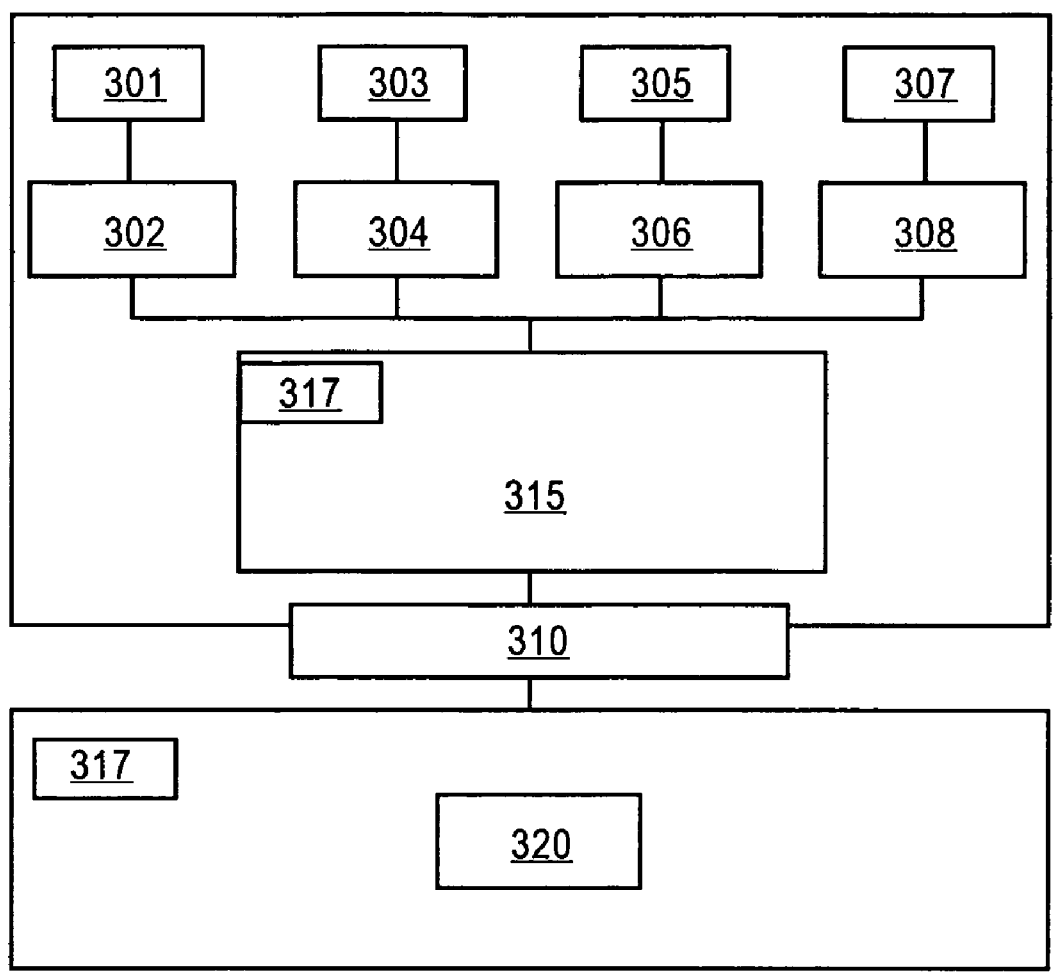
FIG. 3 illustrates a computer system in which at least one embodiment of the invention may be used.

FIG. 3 illustrates a computer system architecture in accordance with one embodiment of the invention. The system 300 of FIG. 1 contains four processing elements 301, 303, 305, 307, containing or are otherwise associated with four local memories 302, 304, 306, 308, respectively. The four processing elements of FIG. 1 may be processing logic, or "cores", within a single microprocessor, in one embodiment. In other embodiments, the processing elements may be individual processors, each on a separate die. The four processing elements communicate with a shared L2 cache memory 315, in one embodiment, and with a main memory 320 via a memory controller 310.

In one embodiment, the shared memory is an L2 cache and/or main memory, such as DRAM. Furthermore, in one embodiment, the local memories are L1 caches, whereas in other embodiments, they may be other types of memory structures. In one embodiment, the shared memory and/or main memory contains a data structure 317 that will store a final result of a combined set of calculations from each of the processing elements. For example, in one embodiment, the data structure will contain a sum of a plurality of numbers computed by each of the processing elements, whereas in other embodiments, the data structure may contain a product, or some other mathematical reduction of numbers computed by each of the processing elements.

In one embodiment of the invention, the memory controller and/or the processing elements contains logic that will allow some or all of the processing elements to store a local copy of the data structure within their respective local memories concurrently with each other, which may later be recombined to obtain a final result. The individual processing elements may store a result of the partial calculation performed by each processing element in their respective local copies of the data structure and then may send the partial results concurrently to the shared L2 cache or to the memory controller, in which the partial results can be combined and stored in main memory concurrently, instead of serially as in the prior art. In one embodiment of the invention, the memory controller contains logic to combine the results of the computations produced by the processing elements and store the combined result into the original data structure within the main memory.

In general, embodiments of the invention used in conjunction with the system of FIG. 3 may perform the partial computations within each processing element and the concurrent reduction of the partial computations into a final combined result to be stored into the original data structure "atomically", that is without intervention by the user via software routines, for example, to control aspects of the process, such as maintaining coherency between the local memories and the shared memory. Moreover, embodiments of the invention may concurrently generate partial results and concurrently combine each partial result into the final result, without incurring the performance costs of a more serialized process, such as in the prior art.

Figure 4:
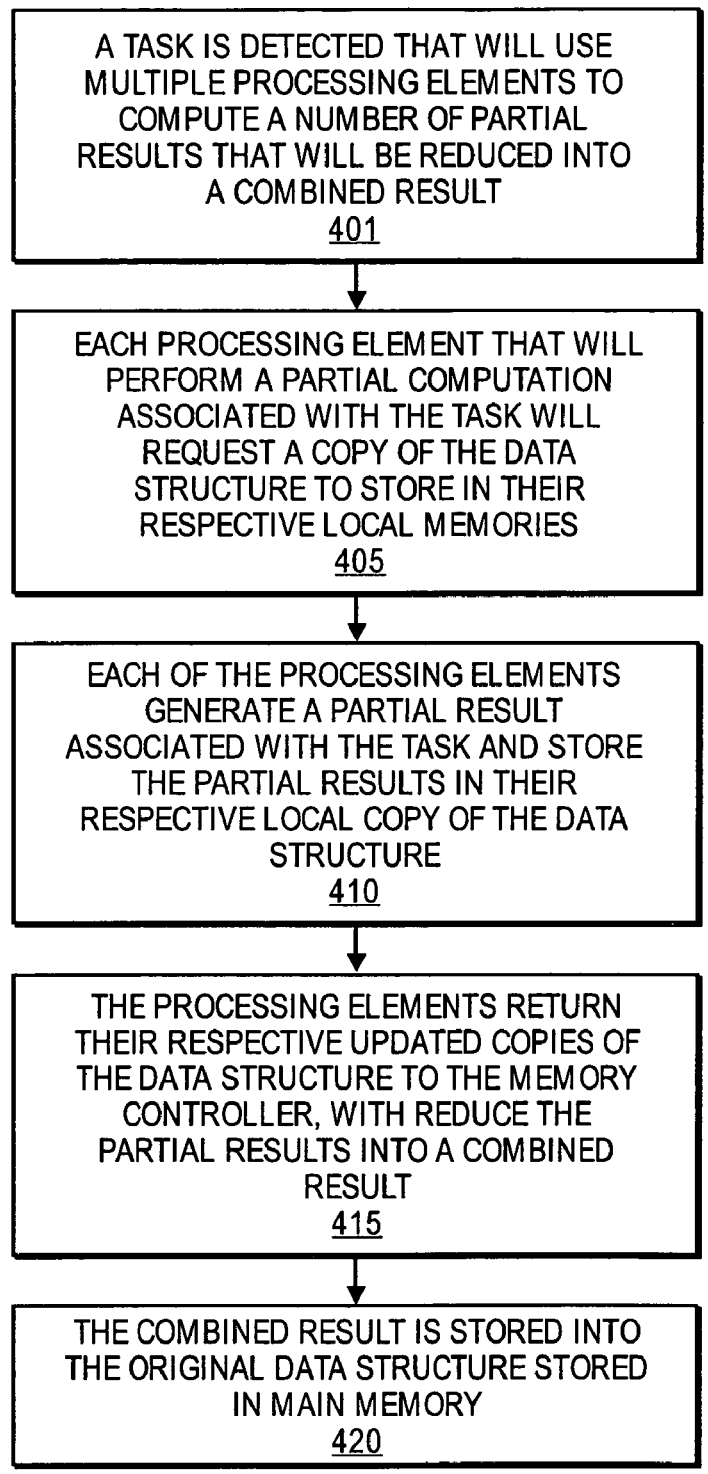
FIG. 4 is a flow diagram illustrating operations which may be used in conjunction with at least one embodiment of the invention.

FIG. 4 is a flow diagram illustrating operations that may be used to perform at least one embodiment of the invention. At operation 401, a task is detected that will use multiple processing elements to compute a number of partial results that will be reduced into a combined result. In one embodiment, the task is indicated by a particular type of instruction within a program being executed by a processing system in which one embodiment is used. In another embodiment, the task is detected by an access by an instruction to a particular memory range, in which a data structure is stored, that is designated to be associated with tasks that will use multiple processing elements to generate a number of partial results, which will then be reduced to a combined result before being stored to the data structure. In other embodiments, the task may be indicated in other ways.

At operation 405, each processing element that will perform a partial computation associated with the task will request a copy of the data structure to store in their respective local memories. In one embodiment, the request is made to the memory controller, which contains logic to allow copies of the data structure to be stored within the local memory of each requesting processor element concurrently. At operation 410, each of the processing elements generates a partial result associated with the task and stores the partial results in its respective local copy of the data structure. At operation 415, the processing elements return their respective updated copies of the data structure to the memory controller, which will reduce the partial results into a combined result. In one embodiment, each processing element may return its respective partial result as soon as it has been computed rather than waiting for other processing elements to complete their respective computations. Furthermore, in one embodiment, the memory controller manages the partial results in such a way so as to prevent conflict conditions among the partial results, such as a race condition. In one embodiment, the memory controller manages the partial results by storing them in a buffer before reducing the partial results to a combined result, such as a summation of the partial results, product of the partial results, or other operation. At operation 420, the combined result is stored into the original data structure stored in main memory.

One or more of the embodiments of the invention discussed herein may be implemented, in whole or in part, using a cache coherency protocol similar, yet modified to accommodate the features of embodiments described herein. For example, in one embodiment, a prior art cache protocol may be used to perform various embodiments of the invention, wherein the protocol may include such features as, a memory write request operation that indicates to a target agent that a parallel reduction operation, consistent with one embodiment of the invention, is to be performed, a reply operation to the memory write request, and an invalidate and update request from reduction logic to local memory to cause all local copies to be sent to the reduction logic.

Figure 5:
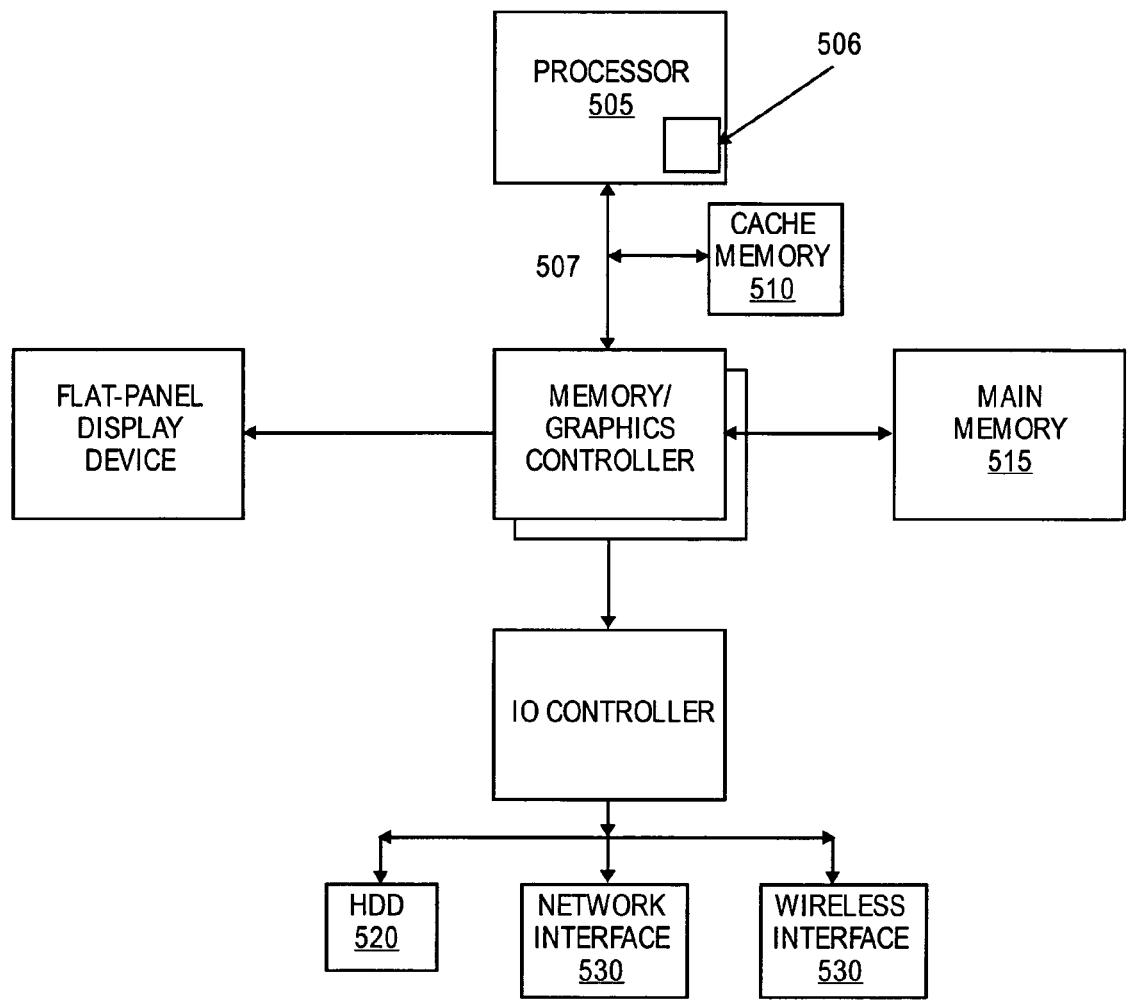
FIG. 5 is a shared bus computer system in which at least one embodiment of the invention may be used.

FIG. 5 illustrates a front-side-bus (FSB) computer system in which one embodiment of the invention may be used. A processor 505 accesses data from a level one (L1) cache memory 510 and main memory 515. In other embodiments of the invention, the cache memory may be a level two (L2) cache or other memory within a computer system memory hierarchy. Furthermore, in some embodiments, the computer system of FIG. 5 may contain both a L1 cache and an L2 cache.

Illustrated within the processor of FIG. 5 is one embodiment of the invention 506. The processor may have any number of processing cores. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 520, or a memory source located remotely from the computer system via network interface 530 containing various storage devices and technologies. The cache memory may be located either within the processor or in close proximity to the processor, such as on the processor's local bus 507.

Furthermore, the cache memory may contain relatively fast memory cells, such as a six-transistor (6T) cell, or other memory cell of approximately equal or faster access speed. The computer system of FIG. 5 may be a point-to-point (PtP) network of bus agents, such as microprocessors, that communicate via bus signals dedicated to each agent on the PtP network. Within, or at least associated with, each bus agent may be at least one embodiment of invention 506, Alternatively, an embodiment of the invention may be located or associated with only one of the bus agents of FIG. 5, or in fewer than all of the bus agents of FIG. 5.

Figure 6:
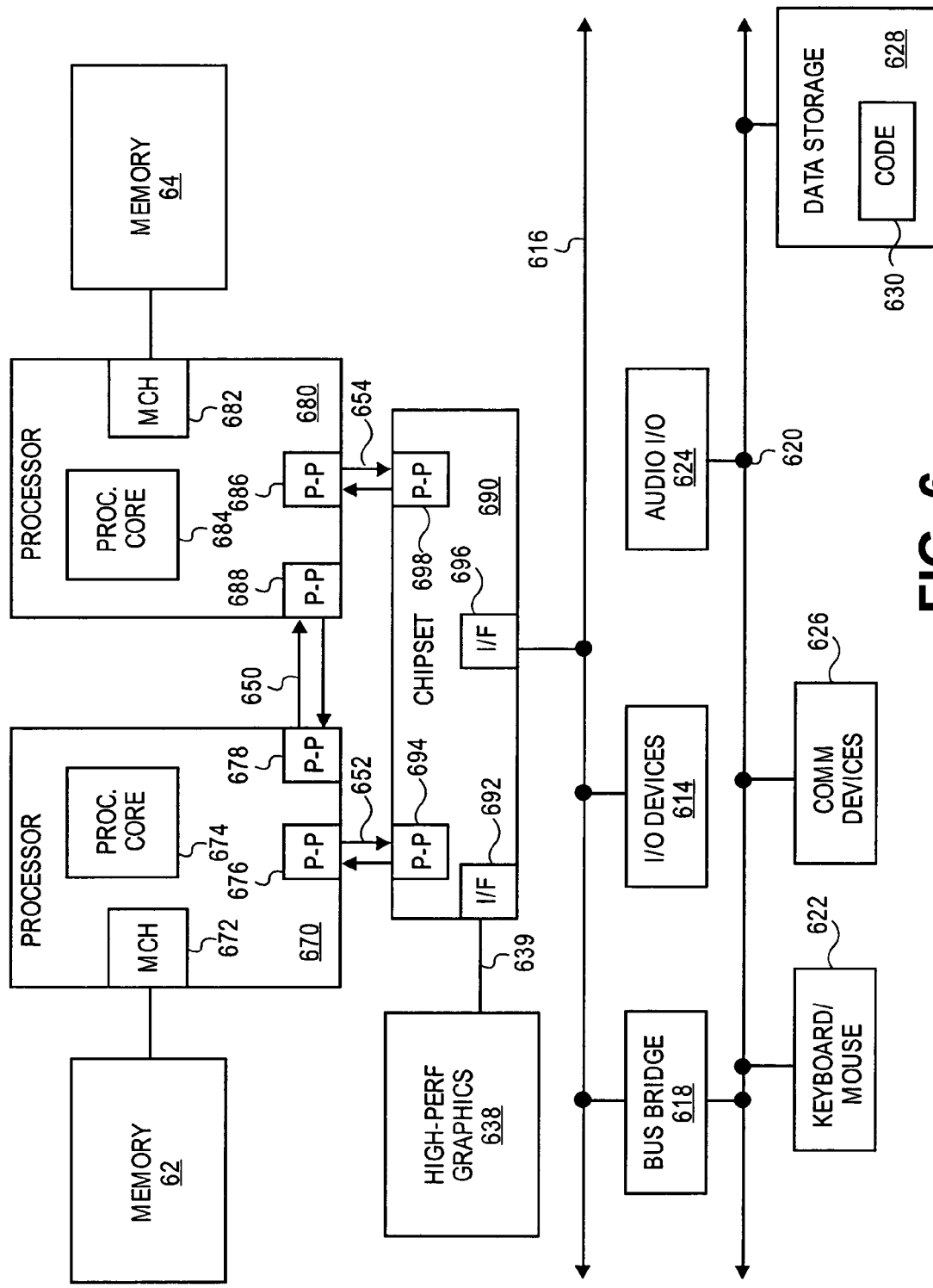
FIG. 6 is a point-to-point computer system in which at least one embodiment of the invention may be used.

FIG. 6 illustrates a computer system that is arranged in a point-to-point (PtP) configuration. In particular, FIG. 6 shows a system where processors, memory, and input/output devices are interconnected by a number of point-to-point interfaces.

The system of FIG. 6 may also include several processors, of which only two, processors 670, 680 are shown for clarity. Processors 670, 680 may each include a local memory controller hub (MCH) 672, 682 to connect with memory 22, 24. Processors 670, 680 may exchange data via a point-to-point (PtP) interface 650 using PtP interface circuits 678, 688. Processors 670, 680 may each exchange data with a chipset 690 via individual PtP interfaces 652, 654 using point to point interface circuits 676, 694, 686, 698. Chipset 690 may also exchange data with a high-performance graphics circuit 638 via a high-performance graphics interface 639. Embodiments of the invention may be located within any processor having any number of processing cores, or within each of the PtP bus agents of FIG. 6.

Other embodiments of the invention, however, may exist in other circuits, logic units, or devices within the system of FIG. 6. Furthermore, in other embodiments of the invention may be distributed throughout several circuits, logic units, or devices illustrated in FIG. 6.

Various aspects of embodiments of the invention may be implemented using complimentary metal-oxide-semiconductor (CMOS) circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. An apparatus comprising:
a plurality of processing elements to compute a plurality of partial results;
a first logic to receive the plurality of partial results in parallel and combine the partial results into a final result, wherein the first logic is within at least one of the plurality of processing elements.

2. The apparatus of claim 1 further comprising a plurality of local memories, each corresponding to one of the plurality of processing elements.

3. The apparatus of claim 2 further comprising a main memory to store a data structure in which the final result is to be stored.

4. The apparatus of claim 3, wherein each of the plurality of local memories are to store a copy of the data structure concurrently, in which one of the plurality of partial results is to be stored.

5. The apparatus of claim 1 wherein the first logic is within a memory controller to couple the plurality of processing elements to a main memory.

6. The apparatus of claim 1 wherein the plurality of processing elements are processing cores within a multi-core processor.

7. The apparatus of claim 1 wherein the plurality of processing elements are each within a processor within a multi-processor computing system.

8. A system comprising:
a main memory to store an instruction to be performed by a plurality of processing elements;
the plurality of processing elements to generate a plurality of partial results of the instruction in parallel;
a first logic to receive the plurality of partial results in parallel and combine the plurality of partial results into a final result to be stored in the main memory, wherein the first logic is within a memory controller to couple the plurality of processing elements to the main memory.

9. The system of claim 8 further comprising a plurality of local memories corresponding to the plurality of processing elements to store a copy of the data structure concurrently.

10. The system of claim 9 further comprising a plurality of buffers to couple the local memories and the main memory.

11. The system of claim 10 wherein the first logic is to provide a copy of the data structure to each of the plurality of processing elements.

12. The system of claim 8 wherein the first logic is within at least one of the plurality of processing elements.

13. The system of claim 8 wherein the plurality of processing elements are processing cores within a multi-core processor.

14. The system of claim 8 wherein the plurality of processing elements are each within a processor within a multi-processor computing system.

15. The system of claim 10 wherein the buffers each comprise a level 2 (L2) cache memory.

16. The system of claim 9 wherein the plurality of local memories each comprise a level 1 (L1) cache.

17. A method comprising:

detecting a task that will use multiple processing elements to compute a number of partial results to be reduced to a combined result, wherein the task is indicated by an instruction type within a program to be executed and by an access to a range of memory addresses;

concurrently storing a plurality of copies of a data structure within a plurality of local memories corresponding to the multiple processing elements;

updating the plurality of copies of the data structure with the plurality of partial results;

combining the updated plurality of copies of the data structure in parallel, wherein the combining is performed by a memory controller coupled to the plurality of processing elements;

storing the combined result into a main memory.

18. The method of claim 17, wherein the combining is performed by at least one of the processing elements.

19. A processor comprising:

a shared cache to store a data structure;

a plurality of local caches to concurrently store and update a plurality of copies of the data structure;

a memory controller to concurrently receive the updated plurality of copies of the data structure and to combine the updated plurality of copies of the data structure into a final result.

20. The processor of claim 19 further comprising a plurality of processing cores coupled to the plurality of local caches to generate a plurality of partial results in response to executing tasks in parallel associated with an instruction.

21. The processor of claim 20 further comprising detection logic to detect whether the instruction is to be performed by the plurality of processing elements in parallel.

22. The processor of claim 21 wherein the detection logic is to detect whether the instruction is a reduction instruction.

23. The processor of claim 22 wherein the detection logic is to detect the address range to be accessed by the instruction.

* * * * *